United States Patent
Quintero et al.

(10) Patent No.: US 12,523,778 B2
(45) Date of Patent: Jan. 13, 2026

(54) LATITUDE OPTIMIZED SATELLITE CONSTELLATION

(71) Applicant: The Johns Hopkins University, Baltimore, MD (US)

(72) Inventors: Charles E. Quintero, Mitchellville, MD (US); Robert S. Duggan, Bethesda, MD (US)

(73) Assignee: The Johns Hopkins University, Baltimore, MD (US)

( * ) Notice: Subject to any disclaimer, the term of this patent is extended or adjusted under 35 U.S.C. 154(b) by 253 days.

(21) Appl. No.: 18/314,080

(22) Filed: May 8, 2023

(65) Prior Publication Data
US 2023/0358896 A1   Nov. 9, 2023

Related U.S. Application Data

(60) Provisional application No. 63/339,687, filed on May 9, 2022.

(51) Int. Cl.
*G01S 19/25* (2010.01)

(52) U.S. Cl.
CPC .................. *G01S 19/258* (2013.01)

(58) Field of Classification Search
CPC ....... G01S 19/258; B64G 1/242; B64G 1/245; B64G 1/1085; H04B 7/19
USPC ............... 701/469, 13, 26, 531; 244/158.6; 370/316; 455/13.2, 427
See application file for complete search history.

(56) References Cited

U.S. PATENT DOCUMENTS

| | | | |
|---|---|---|---|
| 5,553,816 A | | 9/1996 | Perrotta |
| 5,911,389 A | * | 6/1999 | Drake .................. B64G 1/1085 |
| 5,999,127 A | * | 12/1999 | Dezelan ............. H04B 7/18521 |
| 7,136,640 B2 | | 11/2006 | Marko |
| 7,840,180 B2 | | 11/2010 | Rosen |
| 8,360,366 B1 | | 1/2013 | Chung |
| 9,344,182 B2 | | 5/2016 | Bigras et al. |
| 10,348,396 B2 | | 7/2019 | Olson |
| 10,361,773 B2 | | 7/2019 | Vaughan et al. |
| 10,807,739 B1 | * | 10/2020 | Hawkins .............. B64G 1/1007 |

(Continued)

OTHER PUBLICATIONS

Kantsiper, Brian, and Howard Drake. "Wave based design of satellite constellations." Astrodynamics Specialist Conference. 2000. (Year: 2000).*

(Continued)

*Primary Examiner* — Ramon A. Mercado
*Assistant Examiner* — Ellis B. Ramirez
(74) *Attorney, Agent, or Firm* — Todd R. Farnsworth

(57) ABSTRACT

A system can include a plurality of satellites synchronized in a Waves constellation tailored to maximize coverage of a target ground location at one or more predetermined latitudes with a minimal number of satellites. The plurality of satellites can orbit the Earth in a plurality of orbital planes evenly spaced in right ascension of ascending node. The plurality of satellites can be evenly spaced in true anomaly within each orbital plane. The Waves constellation can phase the plurality of orbital planes, such that satellites in neighboring orbital planes simultaneously cross the Equator together with synchronized true anomaly positions, all in ascending or descending motion, thereby forming a wave of satellites in all orbital planes that rise and fall together.

20 Claims, 12 Drawing Sheets

(56) References Cited

U.S. PATENT DOCUMENTS

| | | | |
|---|---|---|---|
| 2002/0151273 A1 | 10/2002 | Mark | |
| 2015/0158602 A1* | 6/2015 | Marshack | B64G 1/1007 |
| 2018/0022474 A1* | 1/2018 | Meek | H04B 7/18513 |
| 2023/0056948 A1* | 2/2023 | Mukae | H04B 7/18513 |

OTHER PUBLICATIONS

Strout, Nathan, "How Project Blackjack is Turning the Corner," C4ISRNET, Jun. 26, 2020, https://www.c4isrnet.com/battlefield-tech/space/2020/06/26/how-project-blackjack-is-turning-the-corner/.

Strout, Nathan, "One Military Space Agency's Plan for 1,000 New Satellites by 2026," C4ISRNET, Jan. 21, 2020, https://www.c4isrnet.com/battlefield-tech/space/2020/01/21/one-military-space-agencys-plan-for-1000-new-satellites-by-2026/.

O'Callaghan, Jonathan, "The Risky Rush for Mega Constellations," Scientific American: Space & Physics, Oct. 31, 2019, https://www.scientificamerican.com/article/the-risky-rush-for-mega-constellations/.

Quintero, Chuck, et al., "Orbital Diversity and Inclination Optimization for Large Count LEO Constellations in Non-Polar Orbits," Sep. 2021, paper presented at Adv. Maui Optical and Space Surveillance Technol. Conf. (amos), Maui, HI.

Walker, J.G., "Continuous Whole-Earth Coverage by Circular-Orbit Satellite Patterns," Royal Aircraft Establishment Technical Report, Mar. 24, 1977.

Ansys, Inc., "Ansys STK | Digital Mission Engineering Software," Product Page, https://www.ansys.com/products/missions/ansys-stk, last accessed May 30, 2023.

Brown, Charles D., "Elements of Spacecraft Design," American Institute of Aeronautics and Astronautics, Inc., Section 3.3, pp. 84-101, 2002.

Wikipedia, "Starlink," Wikipedia, The Free Encyclopedia, https://en.wikipedia.org/w/index.php?title=Starlink&oldid=1157744780, last accessed May 30, 2023.

\* cited by examiner

LATITUDE OPTIMIZED SATELLITE CONSTELLATION

CROSS-REFERENCE TO RELATED APPLICATIONS AND INCORPORATION BY REFERENCE

This application claims the benefit of U.S. Provisional Application No. 63/339,687, filed May 9, 2022, the contents of which are incorporated herein by reference in its entirety.

BACKGROUND

Field

The present disclosure relates to satellite constellation systems and methods, for example, satellite constellation networks using large numbers of satellites known as mega-constellations.

Background

Satellite constellation networks can enable navigation (e.g., the Global Positioning System, or GPS), communications, and Earth monitoring (e.g., sensing, imaging, etc.) by providing large-area fields of view and low-loss free-space paths for inter-satellite links. A single satellite can provide coverage of an area of interest and cross-link communication between satellites in a network. For communications in particular, placing satellites in low Earth orbit reduces latency and the per-unit platform and launch cost. Compared with geostationary orbits (~35,800 km altitude), the low Earth orbit regime (~250-2,000 km) can be exploited with much smaller satellites, as transmitter power scales as the inverse square of the distance to a specified ground station.

As development and production costs decline, mega-constellations (e.g., thousands of satellites) are planned for near-future launches into low Earth orbits by both private and public entities. Notable mega-constellations include SpaceX's Starlink (up to 42,000 satellites planned) and Amazon's Project Kuiper (more than 3,000 satellites planned). Based on recent proposals, a multitude of mega-constellations could introduce over 100,000 new satellites in orbit. More than 18,000 of this total have been proposed for launch in the next 5 years. Even though costs have declined, satellites still can cost billions of dollars to design and launch into orbit. Therefore, skilled artisans have designed various satellite constellation systems to find the most efficient arrangement to maximize coverage, but have been limited to the existing constellation design approaches described in this section.

Designing such mega-constellations can be challenging because the satellites must occupy a finite space with numerous orbital parameters such as altitude, inclination, total number of satellites, distribution of satellites in planes, and phasing between satellite planes. Some communications constellation designs use Polar-Star orbits (e.g., Iridium), which divide the ascending nodes of their orbital planes over 1800 of right ascension of ascending node ("RAAN"). As a result, Polar-Star orbits reduces the number of satellite planes by half but require all the satellites to be in near-polar orbits. This type of constellation is problematic because there is a "seam" between the two halves of the constellation that impedes routing communications traffic between the two halves and creates coverage gaps in equatorial regions. The deployment of proposed mega-constellations utilizing traditional orbital configurations Polar-Star orbits could present an increasing risk of satellite conjunction in polar regions.

Another traditional design, called Walker-Delta constellations, can provide good Earth coverage, but neighboring satellites in adjacent planes constantly change geometries and have widely varying Doppler shifts that hamper cross-plane datalinks. For a traditional Walker-Delta constellation, the satellites in adjacent planes are phased to form a consistent diamond shape near the equator, which results in more consistent coverage at lower latitudes but suboptimal coverage at higher latitudes. Starlink has sought to address the suboptimal coverage with a constellation design that implements multiple "shells" of Walker-Delta constellations: higher inclination "shells" that have less dense populations of satellites, and lower inclination "shells" that have more dense populations of satellites. The result is thousands of satellites in the overall constellation design.

Some existing constellations have used Molniya and Tundra orbits in conjunction with the Earth's rotation to increase the hang time of a satellite over a target ground location in an attempt to prolong duration of coverage. However, Molniya and Tundra orbits are characterized by high altitudes and severely eccentric orbits, which makes coverage irregular and difficult to synchronize effectively.

SUMMARY

Accordingly, there is a need to optimally tailor latitude coverage of a satellite constellation with the least amount of satellites. The ability to position low Earth orbit assets at specific inclination bands would vastly improve communication and reconnaissance satellite capabilities because the Earth's population is concentrated in latitude bands. Additionally, there is a need for a satellite constellation that supports easy data links both within a plane and across planes among a wave to ensure fast transfers of information throughout a network. Finally, there is a need for an efficient satellite constellation that uses a reduced number of satellites compared to current systems, which would lessen substantial financial cost involved in launching satellite mega-constellations, and reduce the chance of collisions in space by decreasing congestion of satellite traffic.

In some embodiments, a system can include a plurality of satellites synchronized in a Waves constellation tailored to maximize coverage of a target ground location at one or more predetermined latitudes with a minimal number of satellites. The plurality of satellites can orbit the Earth in a plurality of orbital planes evenly spaced in right ascension of ascending node. The plurality of satellites can be evenly spaced in true anomaly within each orbital plane. The Waves constellation can phase the plurality of orbital planes, such that satellites in neighboring orbital planes simultaneously cross the Equator together with synchronized true anomaly positions, all in ascending or descending motion, thereby forming a wave of satellites in all orbital planes that rise and fall together.

In some embodiments, a method for arranging satellites in a Waves constellation can include inclining a plurality of satellites in a satellite constellation for a coverage overlap at a latitude band based on predetermined orbital parameters. In some embodiments, the method can further include phasing a plurality of orbital planes with even spacing in right ascension of ascending node based on the inclining. In some embodiments, the method can further include synchronizing the plurality of satellites to transition over the latitude band within a predetermined percentage of an orbital period.

In some embodiments, the method can further include positioning the plurality of satellites in a plurality of waves to maintain constant coverage of the latitude band based on the synchronizing. In some embodiments, the method can further include positioning the plurality of satellites with even spacing in true anomaly within each of the plurality of orbital planes based on the plurality of waves.

Further features and exemplary embodiments of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present disclosure and, together with the description, further serve to explain the principles of the present disclosure and to enable those skilled in the relevant art(s) to make and use embodiments described herein.

Figure 1A:
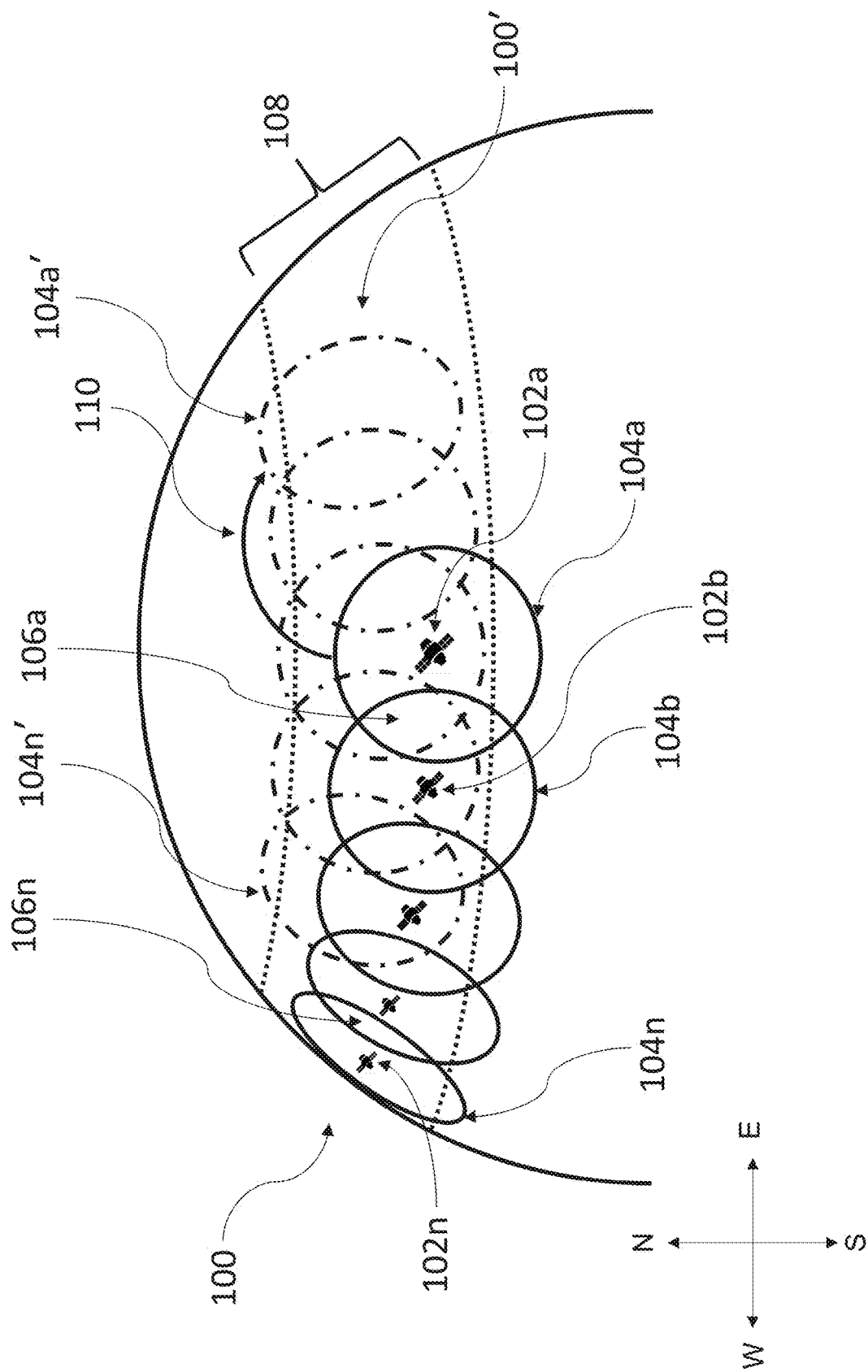
FIGS. 1A and 1B illustrate a wave of satellites transitioning across a desired latitude band to provide continuous coverage for a transit time of the wave, according to some embodiments.

The features and exemplary embodiments of the embodiments will become more apparent from the detailed description set forth below when taken in conjunction with the drawings. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more embodiments that incorporate the features of this present invention. The disclosed embodiment(s) merely exemplify the present invention. The scope of the invention is not limited to the disclosed embodiment(s). The present invention is defined by the claims appended hereto.

The embodiment(s) described, and references in the specification to "one embodiment," "an embodiment," "an example embodiment," "an exemplary embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "about" or "substantially" or "approximately" as used herein indicates the value of a given quantity that can vary based on a particular technology. Based on the particular technology, the term "about" or "substantially" or "approximately" can indicate a value of a given quantity that varies within, for example, 1-15% of the value (e.g., ±1%, ±2%, ±5%, ±10%, or ±15% of the value).

The term "optimization" or "optimized" or "optimize" as used herein means maximizing latitude coverage while minimizing the number of satellites in a constellation.

References herein to "Earth" may apply to the Earth or any planet or planetary body. For example, satellites depicted herein may be in orbit around Earth or another planet.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, or other devices executing the firmware, software, routines, instructions, etc.

Exemplary Satellite Wave

Figure 1B:
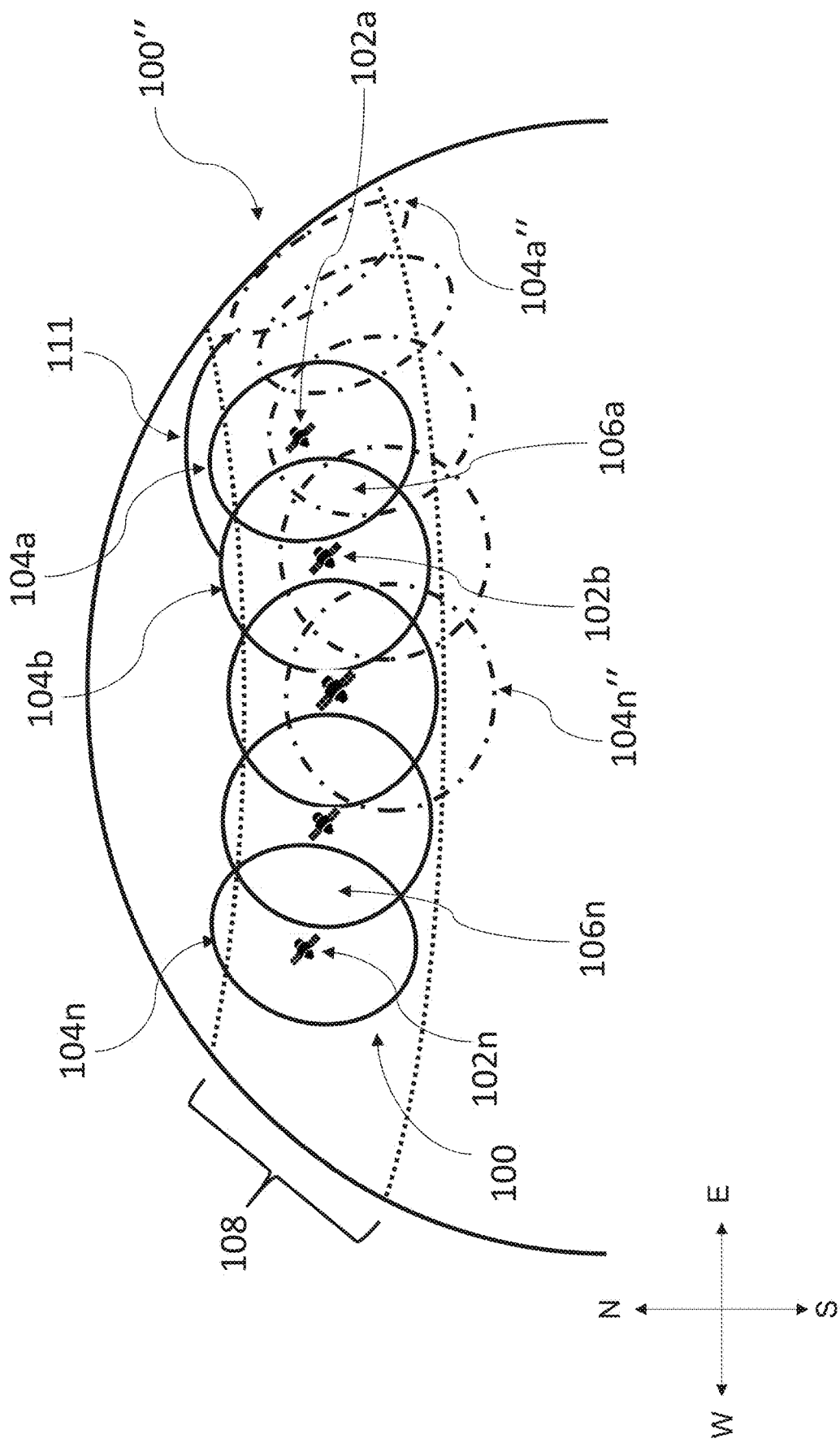

FIGS. 1A and 1B illustrate a wave 100 of satellites 102a-102n transitioning across a desired latitude band 108 to provide continuous coverage for a transit time of the wave 100, according to some embodiments. In some embodiments, wave 100 can include any number of satellites 102a-102n, coverage areas 104a-104n, and overlap areas 106a-106n. In some embodiments, a and n can be any positive integer from 1 to infinity.

In some embodiments, wave 100 can be formed by a set of satellites 102a-102n that cross the equator (i.e., 0 degrees latitude) together, all in ascending or descending motion. Satellites 102a-102n can include first through nth satellites, where n is an integer greater than 1. In some embodiments, each satellite 102a-102n within wave 100 can be located in a separate corresponding orbital plane. True anomaly positions of satellites 102a-102n can be synchronized so that satellites 102a-102n at the top and bottom of their respective orbits fly in a coordinated manner over maximum and minimum latitudes, and therefore provide maximum coverage at a desired latitude band 108. In this exemplary configuration, a "Waves constellation" design can be formed. Accordingly, a Waves constellation design can phase shift true anomaly positions with respect to conventional Walker-Delta true anomaly positions in order to optimize coverage at high latitudes. A Wave constellation design can be compatible for use in navigation, communications, telephony, radio, electronic support measures, radar, imaging, electro-optical/infrared systems, and the like.

In some embodiments, each satellite 102a-102n can be attributed with a respective coverage area 104a-104n (e.g., satellite 102a can be attributed with coverage area 104a, satellite 102b can be attributed with coverage area 104b, etc.). Coverage areas 104a-104n can include first through nth coverage areas, where n is an integer greater than 1 corresponding to the number of satellites 102a-102n. A coverage area 104a-104n can be an observable region of the Earth's surface. In some embodiments, coverage areas 104a-104n can be tailored to any shape and size. For example, a coverage area 104a-104n can be a circle with a radius of 3000 km.

In some embodiments, each coverage area 104a-104n can share an overlap area 106a-106n with adjacent coverage areas 104a-104n (e.g., coverage area 104a and coverage area 104b can share an overlap area 106a). Overlap areas 106a-106n can include first through nth overlap areas, where n is an integer greater than 1. As a spacing of satellites 102a-102n increases, a surface area of overlap areas 106a-106n decreases for any selected altitude. In some embodiments, overlap areas 106a-106n can occupy 20% of coverage areas 104a-104n.

In some embodiments, satellites 102a-102n can fly with an eastward movement at Northernmost and Southernmost parts of an inclined orbit. The eastward movement of satellites 102a-102n can reduce a ground velocity of each satellite 102a-102n because satellites 102a-102n travel in a same direction as the Earth's rotation. Additionally, the satellites 102a-102n transitioning from ascending motion to descending motion in their respective orbits can increase time spent over a latitude band 108, thereby increasing a time called "access time" in which wave 100 can provide coverage of latitude band 108 by maintaining latitude band 108 within a field of view of satellites 102a-102n.

In some embodiments, as shown in FIG. 1A, wave 100 can have an ascending eastward movement 110 into a future position (e.g., wave 100' including subsequent coverage areas 104a'-104n') at a top of an ascending section of orbits. In some embodiments, as shown in FIG. 1B, wave 100 at a top of a descending section of orbits can have a descending eastward movement 111 into a future position (e.g., wave 100" including subsequent coverage areas 104a"-104n"). A positioning of an inclination for each satellite 102a-102n at a center of latitude band 108, and ascending eastward movement 110 and descending eastward movement 111 of satellites 102a-102n can maximize access time of coverage areas 104a-104n over target ground locations within latitude band 108. As wave 100 ascends North and to the East with ascending eastward movement 110 and then starts to descend South and to the East with descending eastward movement 111, a relative motion of target ground locations within latitude band 108 can be decreased. As shown in FIGS. 1A and 1B, target ground locations within latitude band 108 can enter coverage areas 104a-104n from the East and transition across access of subsequent coverage areas 104a'-104n' provided by satellites 102a-102n traveling with ascending eastward movement 110 (as shown in FIG. 1A), and then transition across access of subsequent coverage areas 104a"-104n" provided by satellites 102a-102n traveling with descending eastward movement 111 across latitude band 108 (as shown in FIG. 1B).

In some embodiments, eastward movement of satellites 102a-102n can allow a plurality of adjacent orbital planes to be evenly spaced in right ascension of ascending node ("RAAN"). By spacing adjacent orbital planes in RAAN, a first coverage area 104a of satellite 102a within wave 100 can lose coverage of target ground locations within latitude band 108, while a second coverage area 104b of satellite 102b within wave 100 behind satellite 102a in RAAN can resume coverage of target ground locations within latitude band 108.

In some embodiments, synchronizing satellites 102a-102n across all orbital planes can allow a desired latitude for target ground locations within latitude band 108 to remain in persistent coverage for a substantial portion of an orbital period. For example, coverage areas 104a-104n can view the desired latitude for target ground locations within latitude band 108 for 12% of the orbital period of satellites 102a-102n at low latitudes, thus nine of waves 100 can maintain constant 100% coverage. In another example, coverage areas 104a-104n can view the desired latitude for target ground locations within latitude band 108 for 12% of the orbital period of satellites 102a-102n at high latitudes.

In some embodiments, a Waves constellation can provide non-equatorial coverage without gaps better than the prior art. Traditional Walker-Delta orbital planes are phased such that neighboring satellites are hexagonally close-packed as the satellites pass the equator, which results in consistent coverage at lower latitudes but suboptimal coverage at higher latitudes. In contrast, Waves orbital planes can be phased such that satellites in neighboring planes are at the same true anomaly, thereby forming a wave of satellites in all orbital planes that rise and fall together. This phasing can determine whether satellites bunch and spread apart or remain more evenly spaced at desired latitudes. The co-phasing used in the Waves constellation can be more efficient at maximizing a percentage of time that at least one satellite is in a field of view (FOV) of a target ground location ("fractional coverage"). In some embodiments, a Waves constellation can maintain better fractional coverage than a Walker-Delta constellation with fewer number of planes and the same number of satellites per plane because of the difference in how the planes are phased. A Waves constellation can consistently keep at least one satellite in view of a desired latitude, whereas a Walker-Delta constellation spends more time with zero or more than two satellites over the desired latitude. As a result, a Waves constellation can offer a significant reduction in the number of satellites for providing persistent coverage for a desired latitude.

In some embodiments, a Waves constellation can attain up to 100% fractional coverage. In one exemplary embodiment, a Waves constellation can include 9 orbital planes, and 9 satellites per orbital plane, totaling 81 satellites, each satellite with orbital elements of a 900 km altitude, a 45 degree inclination, and a 55 degree satellite antenna acceptance angle as measured from nadir of the satellite. In this exemplary embodiment, the Waves constellation can provide a fractional coverage of 100% for persistent and constant access to latitudes between 22 degrees latitude and 50 degrees latitude, thereby covering the United States. In this exemplary embodiment, equatorial coverage can be filled with a zero inclination orbital plane with only 12 satellites, resulting in a complete coverage constellation with only 93 satellites, which is substantially less than prior art embodiments using strictly Walker-Delta constellations. In this exemplary embodiment, there can be a 40% reduction in the number of satellites for providing persistent coverage compared to a prior art Walker-Delta constellation.

Exemplary Waves Constellation System

FIGS. 2A-2F illustrate a wave 100 descending and ascending across Earth due to satellites 102a-102n orbiting in their respective orbital planes 212a-212n, according to some embodiments. Orbital planes 212a-212n can include first through nth orbital planes, where n is an integer greater than 1 corresponding to the number of satellites 102a-102n.

In some embodiments, a plurality of satellites 102a-102n can be synchronized in a Waves constellation tailored to maximize coverage of target ground locations at one or more predetermined latitudes with a minimal number of satellites 102a-102n. In some embodiments, the plurality of satellites 102a-102n can orbit the Earth in a plurality of orbital planes 212a-212n evenly spaced in RAAN. In some embodiments, a plurality of satellites can be evenly spaced in true anomaly within each orbital plane 212a-212n. With this exemplary configuration, a Waves constellation can phase the plurality of orbital planes 212a-212n, such that satellites 102a-102n in neighboring orbital planes 212a-212n simultaneously cross the Equator together with synchronized true anomaly positions, all in ascending or descending motion, thereby forming a wave 100 of satellites 102a-102n in all orbital planes 212a-212n that rise and fall together. As shown in FIGS. 2A-2F, satellites 102a-102n can completely cover desired latitudes around the Earth's circumference. Because every orbital plane 212a-212n can be synchronized, a desired latitude can be covered by a number of satellites 102a-102n equal to a number of orbital planes 212a-212n.

Figure 2A:
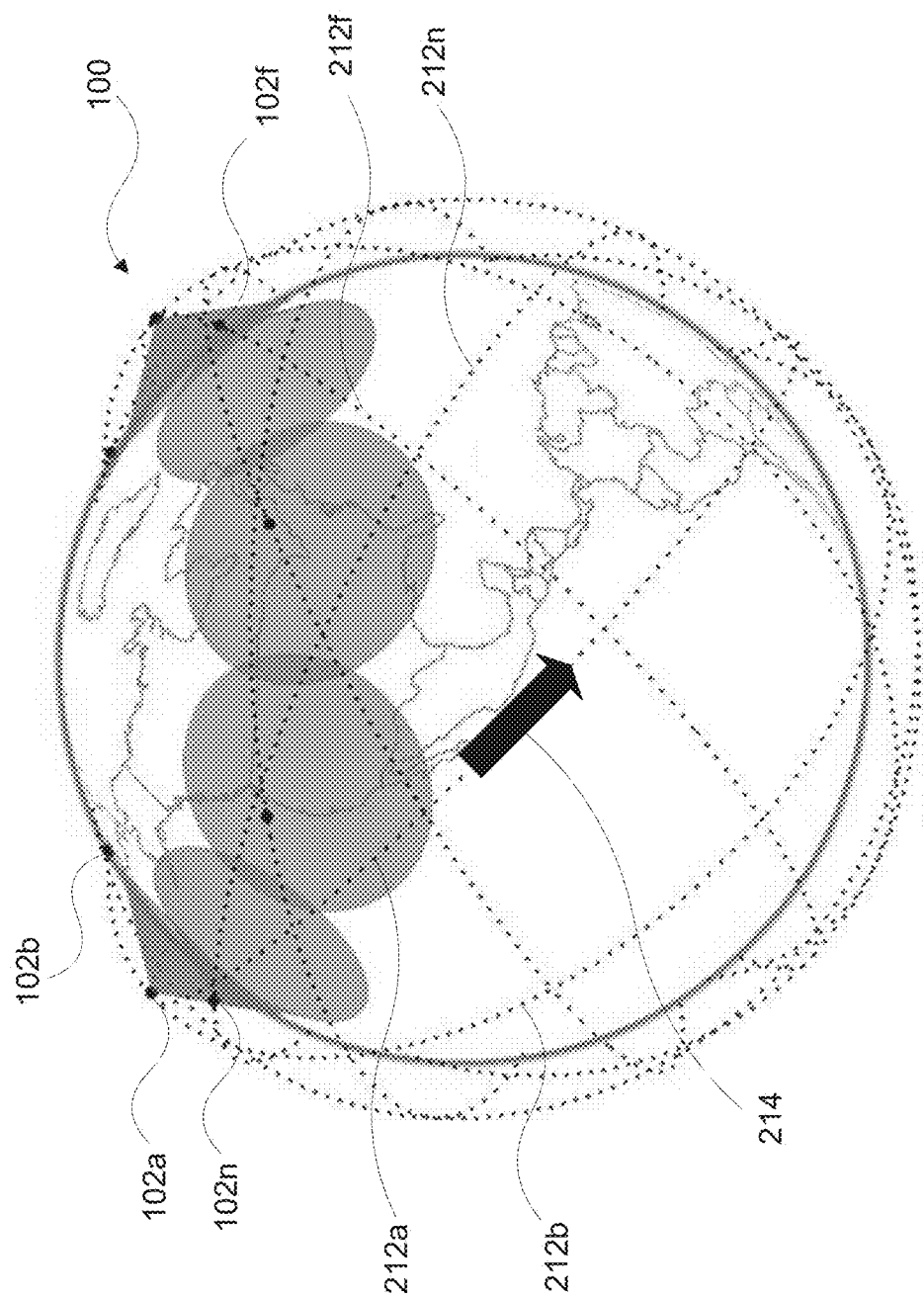
FIGS. 2A-2F illustrate a wave descending and ascending across Earth due to satellites orbiting in their respective orbital planes, according to some embodiments.
Figure 2B:
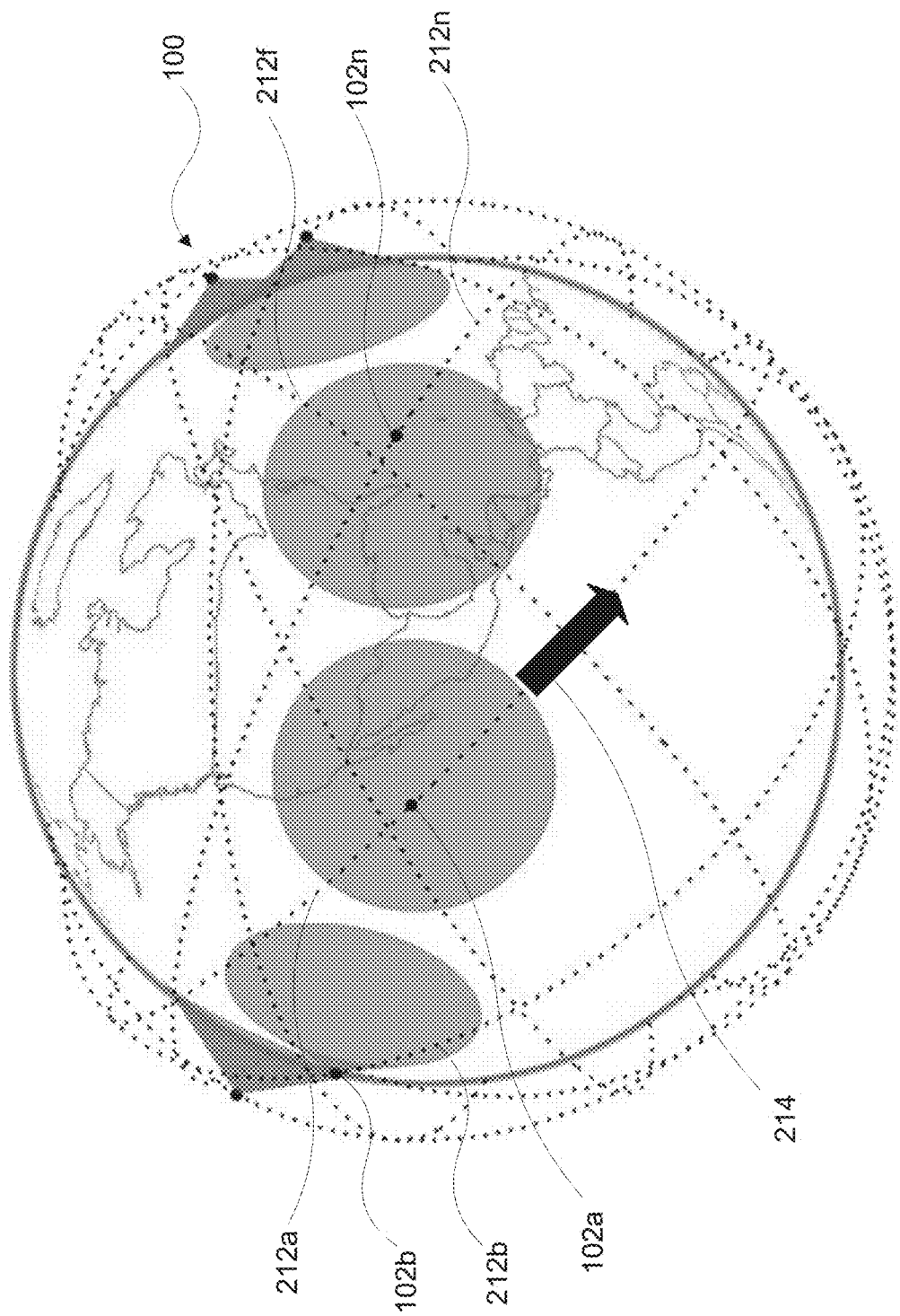
Figure 2C:
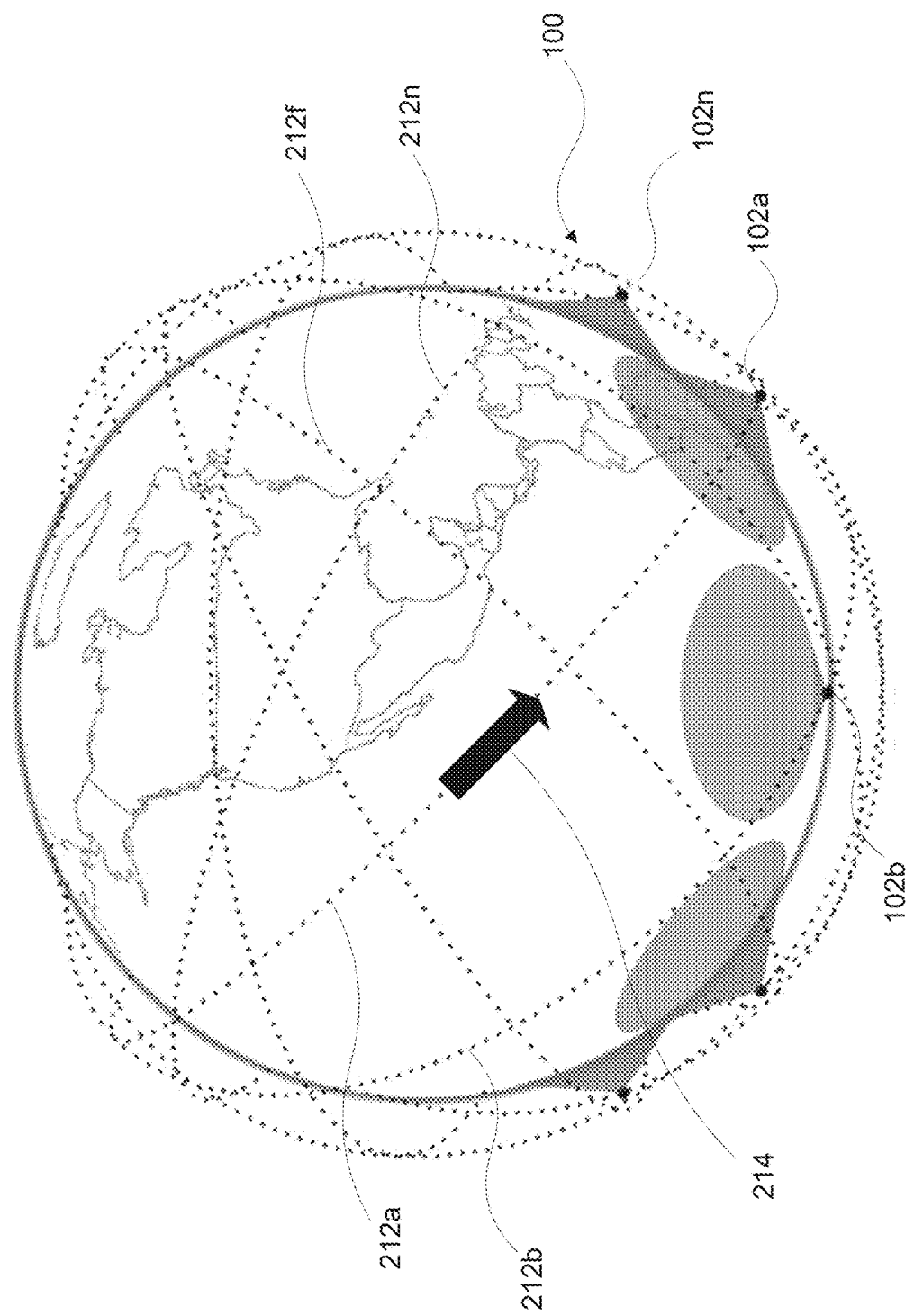

FIGS. 2A-2C illustrate a wave 100 in a descending motion 214 across Earth due to satellites 102a-102n orbiting in their respective orbital planes 212a-212n, according to some embodiments. In some embodiments, descending motion 214 can be in any southern direction. In some embodiments, a direction of descending motion 214 can depend on an angular value of RAAN for orbital planes 212a-212n. FIG. 2A illustrates wave 100 located in the Northern Hemisphere. FIG. 2B illustrates a later moment of an orbital period for satellites 102a-102n traveling along their respective orbital planes 212a-212n to move wave 100 with descending motion 214 from the Northern Hemisphere to the Equator. FIG. 2C illustrates a later moment of an orbital period for satellites 102a-102n traveling along their respective orbital planes 212a-212n to move wave 100 with descending motion 214 from the Equator to the Southern Hemisphere.

Figure 2D:
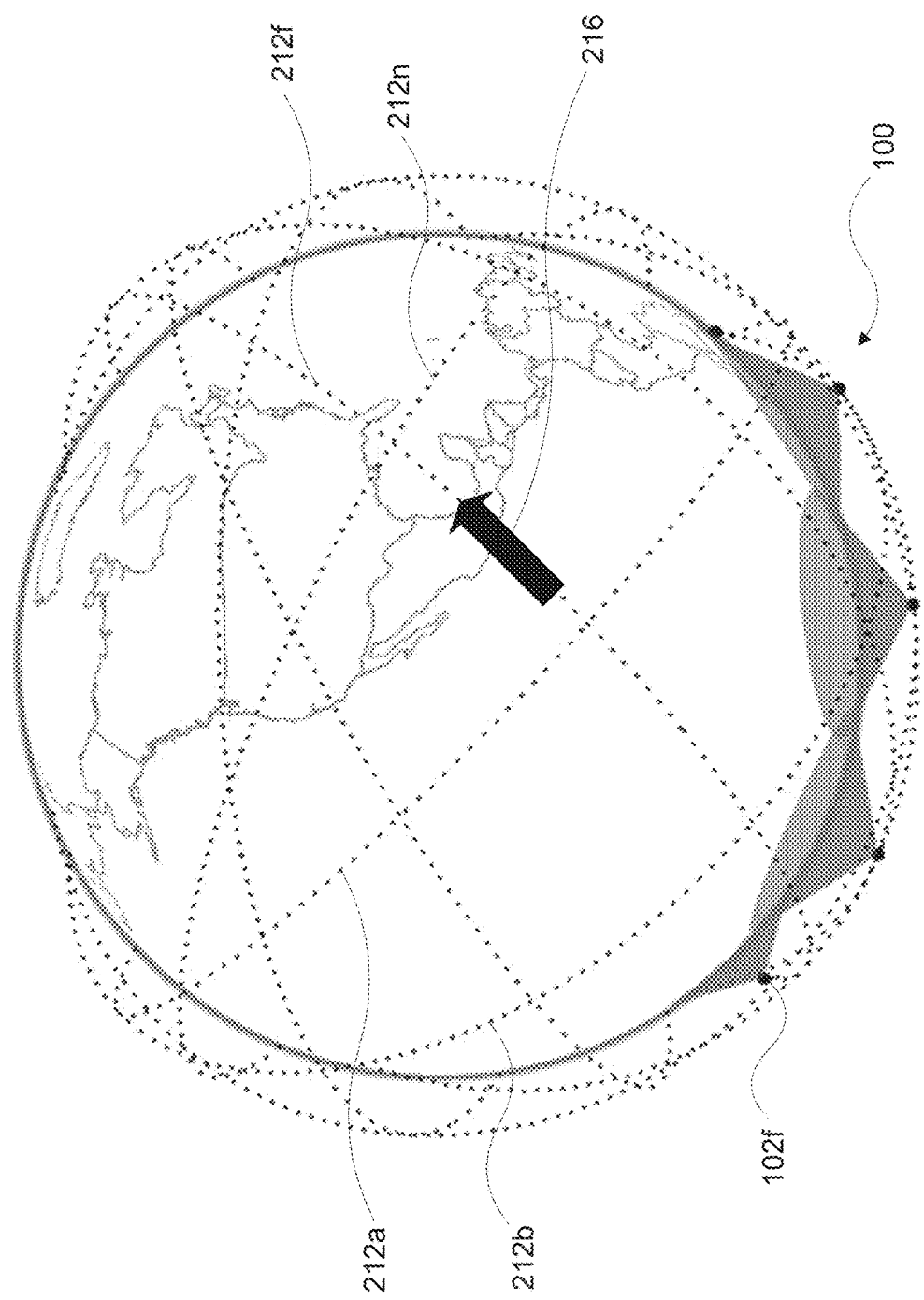
Figure 2E:
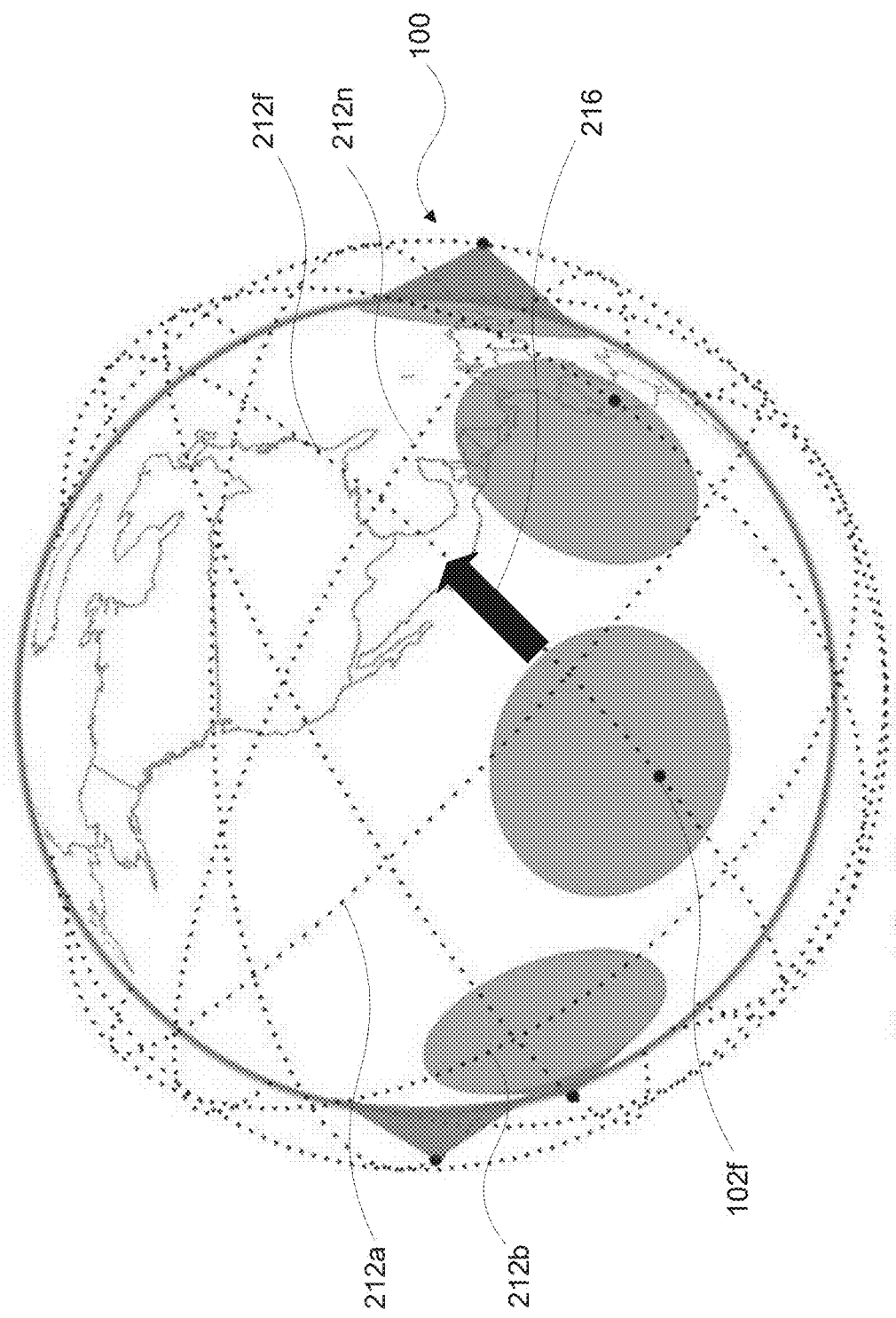
Figure 2F:
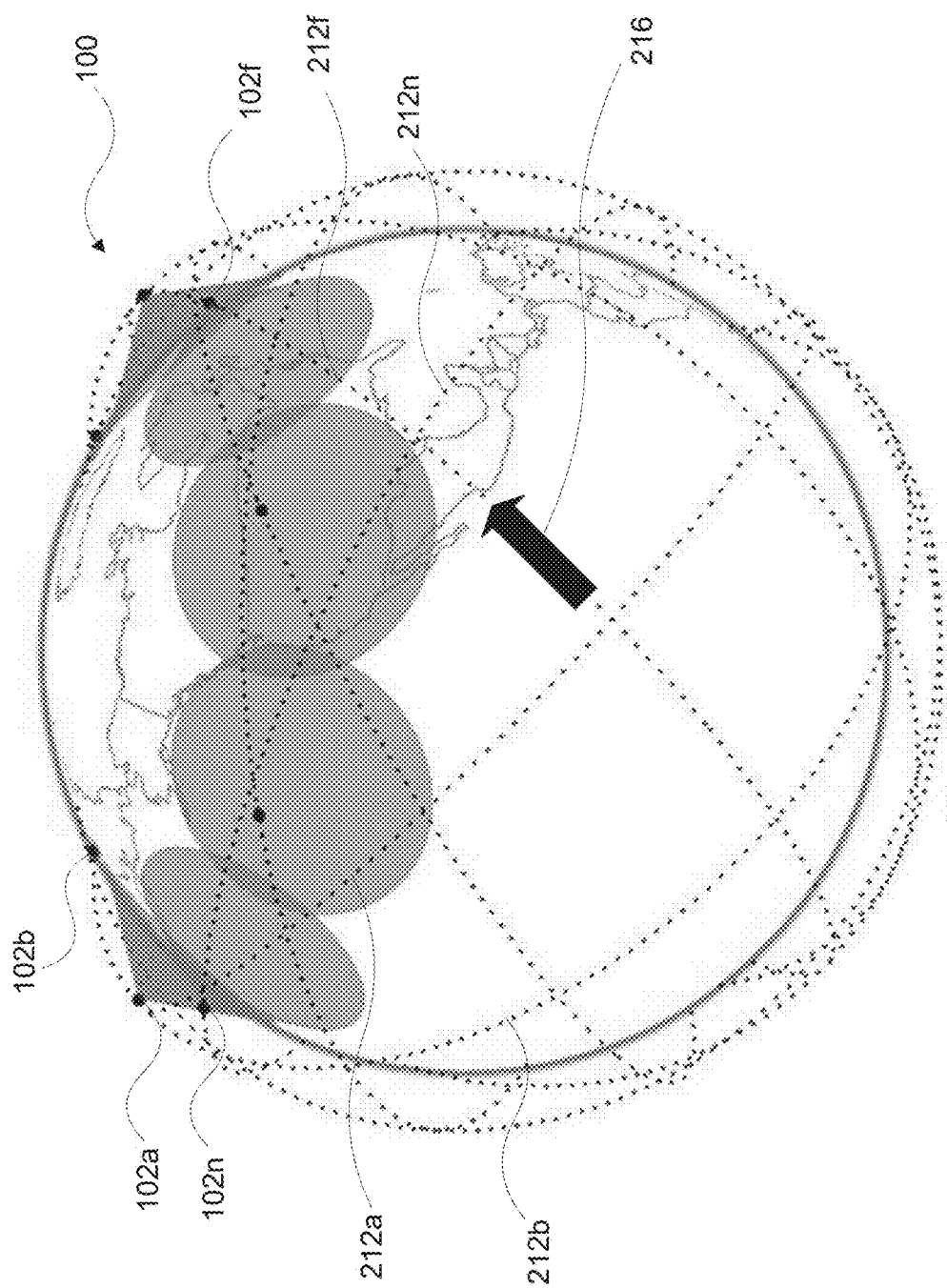

FIGS. 2D-2F illustrate a wave 100 in an ascending motion 216 across Earth due to satellites 102a-102n orbiting in their respective orbital planes 212a-212n, according to some embodiments. In some embodiments, ascending motion 216 can be in any northern direction. In some embodiments, a direction of ascending motion 216 can depend on an angular value of RAAN for orbital planes 212a-212n. FIG. 2D illustrates wave 100 located in the Southern Hemisphere. FIG. 2E illustrates a later moment of an orbital period for satellites 102a-102n traveling along their respective orbital planes 212a-212n to move wave 100 with ascending motion 216 from the Southern Hemisphere to the Equator. FIG. 2F illustrates a later moment of an orbital period for satellites 102a-102n traveling along their respective orbital planes 212a-212n to move wave 100 with ascending motion 216 from the Equator to the Northern Hemisphere.

A typical function of a mega-constellation can be routing information between satellites to get to a desired downlink location. Relative positions of satellites are always changing, so optimal routing can be a complex, time-dependent problem. Further, one has to point a cross-link communication beam (often optical) to adjacent satellites.

In some embodiments, the Waves constellation can support data links between the plurality of satellites within a single orbital plane, across orbital planes 212a-212n among a wave 100, or both. In some embodiments, each satellite 102a-102n can have a consistent positional relationship to other satellites leading/lagging within corresponding orbital planes 212a-212n. Further, within wave 100, each transmitting satellite 102a-102n can always have a neighboring satellite 102a-102n directly east and west of the transmitting satellite 102a-102n because of the co-phasing of orbital periods. For example, a transmitting satellite 102a can have a neighboring satellite 102b to the west and a neighboring satellite 102n to the east to receive signals from transmitting satellite 102a. In some embodiments, neighboring orbital planes 212a-212n can be in-line with co-planar satellites 102a-102n while satellites 102a-102n are at a desired latitude. With this configuration, co-planar satellites 102a-102n can form cross-link connections are at their minimum separation and thus easier to close than in-plane lengths. Because satellites 102a-102n in wave 100 can occupy the same latitude while moving West to East, the Waves constellation can allow for greatly reduced steering and pointing. As a result, message traffic can travel to any longitude along wave 100, and then traverse along an orbital plane 212a-212n to arrive at a desired destination. These cross-links between satellites 102a-102n for data transfer between orbital planes 212a-212n can likely be transmitted by a single antenna system with fixed pointing forward and aft and reduced routing complexity and fragility to achieve a time-optimal downlink.

Figure 3A:
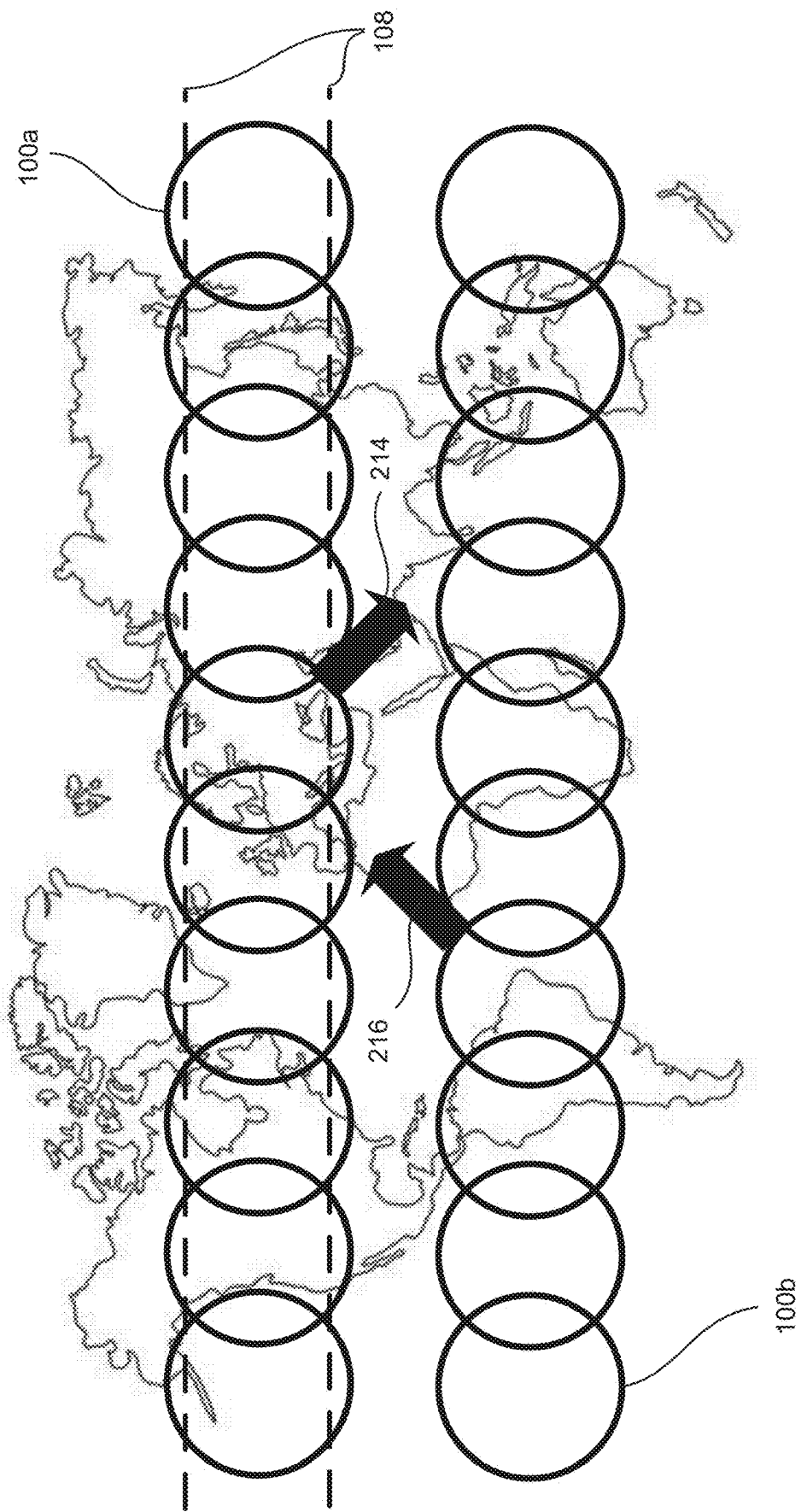
FIGS. 3A and 3B illustrate a wave ascending to resume coverage from a descending wave, each wave spaced in true anomaly at a transition time required for an individual wave to complete its transit over a desired latitude band, according to some embodiments.
Figure 3B:
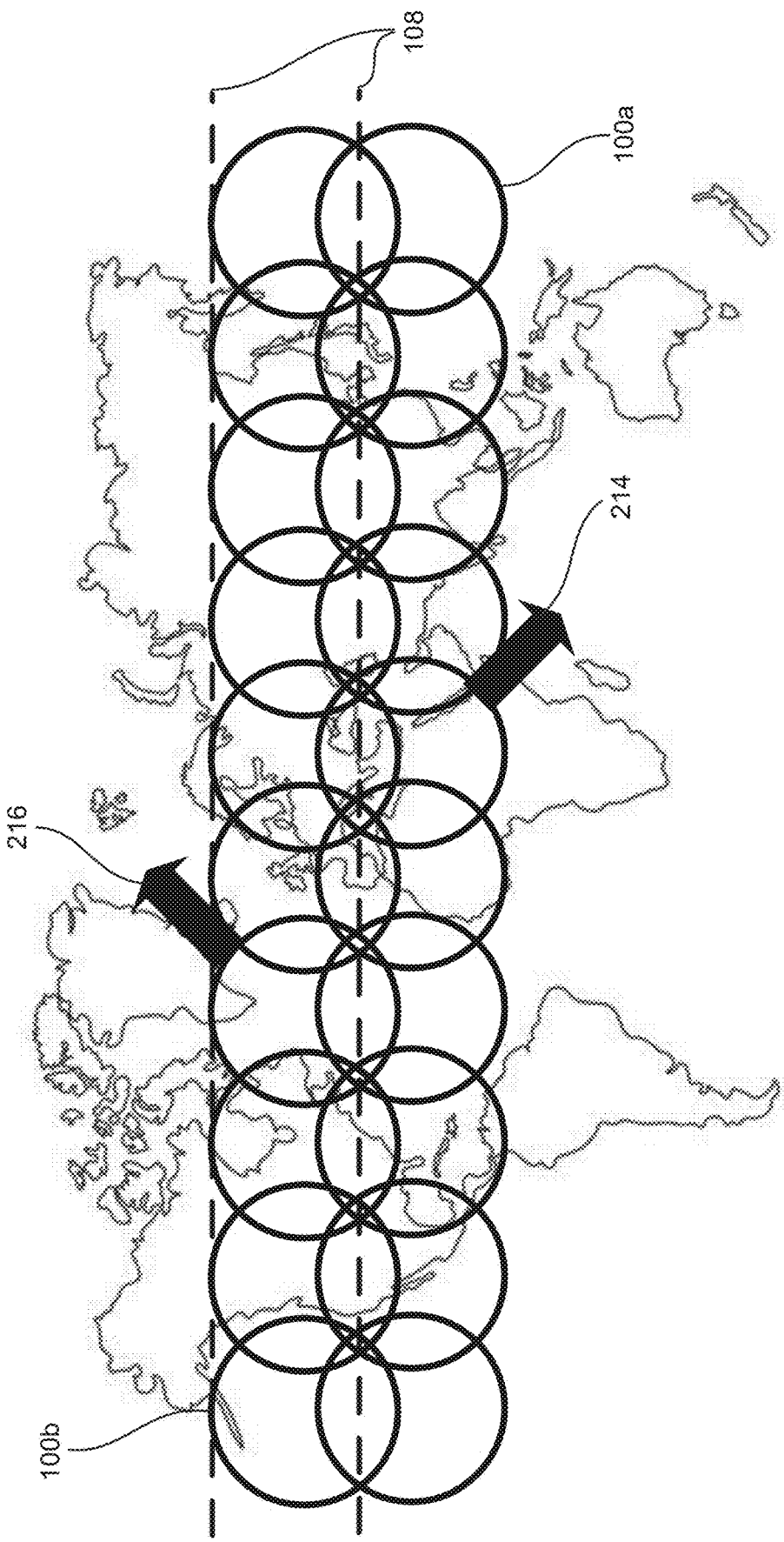

FIGS. 3A and 3B illustrate a wave 100b ascending to resume coverage from a descending wave 100a, with each wave spaced in true anomaly at a transition time required for an individual wave to complete its transit over a desired latitude band 108, according to some embodiments.

At higher latitudes, as longitude lines compress, fewer satellites are needed in each wave to provide complete coverage. The coverage over these inclinations is further increased because a satellite slows and reverses its latitude rate at the top and bottom of the orbits. These factors can increase the access time over desired latitudes, as compared to the equator. A Waves constellation can be optimized by spacing adjacent orbital planes (e.g., orbital planes 212a-212n as shown in FIGS. 2A-2F) in RAAN so that, as one satellite in a wave moves west to east and loses coverage for a given longitude, a satellite behind it in RAAN moves into place and continues the coverage. Then, as a first wave descends below the desired latitude, a second wave ascends and resumes coverage. In some embodiments, the first wave and second wave can overlap for a fraction of an orbital period as the satellites travel in their respective orbits.

In some embodiments, a wave 100a of satellites (e.g., satellites 102a-102n as shown in FIGS. 1A and 1B) can provide access for a desired latitude band 108. In some embodiments, desired latitude band 108 can be any range between specified latitudes on the Earth. In the exemplary embodiments shown in FIGS. 3A and 3B, desired latitude band 108 can be approximately 35° N to approximately 65° N. As an access time period passes, wave 100a can depart desired latitude band 108 with a descending motion 214 (e.g, descending motion 214 as shown in FIGS. 2A-2C). In some embodiments, descending motion 214 can be in any southern direction. In some embodiments, a direction of descending motion 214 can depend on an angular value of RAAN for orbital planes 212a-212n.

In some embodiments, a wave 100b of satellites (e.g., satellites 102a-102n as shown in FIGS. 1A and 1B) can approach desired latitude band 108 with an ascending motion 216 (e.g., ascending motion 216 as shown in FIGS. 2D-2F). In some embodiments, ascending motion 216 can be in any northern direction. In some embodiments, a direction of ascending motion 216 can depend on an angular value of RAAN for orbital planes 212a-212n.

In some embodiments, for a given inclination, subsequent wave 100b can be spaced so that it reaches desired latitude band 108 as previous wave 100a loses coverage of desired latitude band 108 as it departs desired latitude band 108. With this configuration, wave 100b can resume coverage of desired latitude band 108 once wave 100a has completed its coverage of desired latitude band 108. In some embodiments, wave 100a and wave 100b can overlap as wave 100a and wave 100b pass by each other (as shown in FIG. 3B). In some embodiments, a Waves constellation can have first through nth amount of waves 100a-100n, wherein n is an integer greater than 1. Every subsequent wave can resume coverage of a previous wave (e.g., 100b resumes coverage for 100a, 100c resumes coverage for 100b, 100d resumes coverage for 100c, etc.). By rotating waves over a freely selectable latitude, a Waves constellation can separate northern/southern satellite populations from equatorial satellite populations, in contrast to the prior art that has maintained coverage in the equatorial regions as a driving requirement.

In some embodiments, a plurality of layers of Wave constellations can be added to extend coverage to low latitudes while still maintaining reduced satellite populations as compared with Walker-Delta constellations. In some embodiments, a plurality of Waves constellations having different inclinations can be stacked in layers to evenly spread coverage across desired latitude band 108. With such an exemplary configuration, the layered Waves constellation can provide a wider latitude band with the same access and reduce or eliminate gaps in coverage compared to a single Waves constellation.

Figure 4:
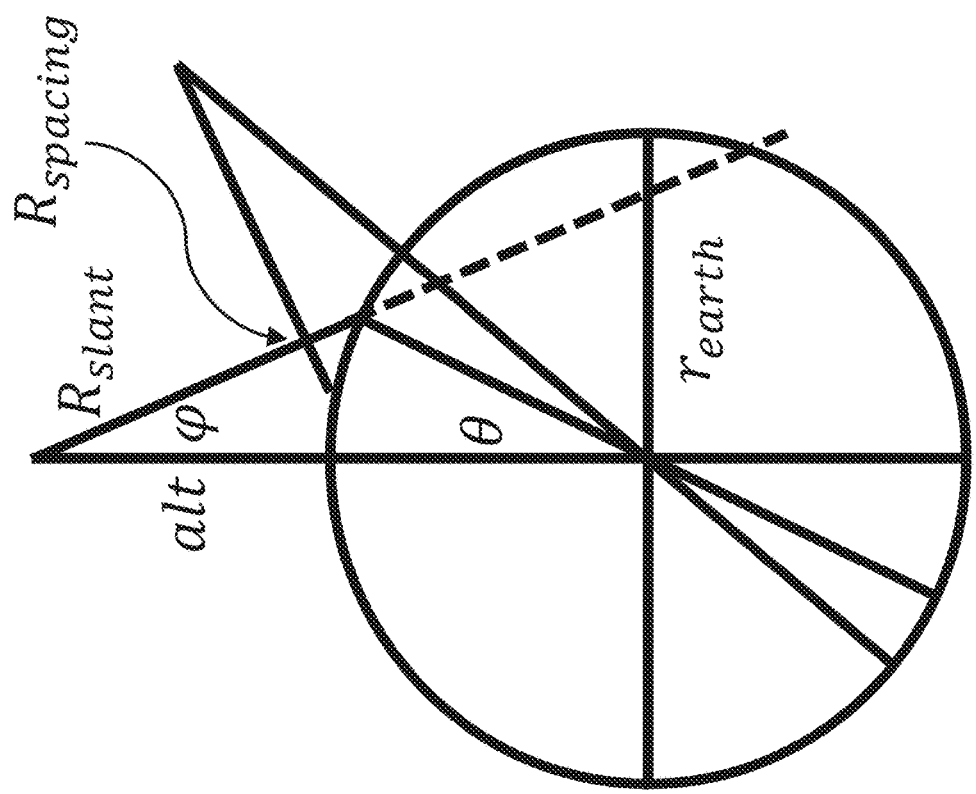
FIG. 4 illustrates a diagram used for deriving orbital parameters for a Waves constellation, according to some embodiments.

FIG. 4 illustrates a diagram used for deriving orbital parameters for a Waves constellation, according to some embodiments.

As discussed previously, the rotation of the Earth can reduce the ground velocity of satellites 102a-102n in the Northernmost and Southernmost extremes of their non-retrograde orbits. Specifically, the ground velocity of inclined satellites 102a-102n can slow during ascending motion 216 (changing latitude South to North) and descending motion 214 (changing latitude North to South). During that portion of orbit for satellites 102a-102n, the Earth's rotation can align with an orbital path of satellites 102a-102n, thereby dictating a ground speed of:

$$v_{ground} = v_{satellite} - v_{earth\ equator} \cdot \cos\left(2\pi \cdot \frac{lat}{incl}\right)$$

wherein $v_{ground}$ is the satellite's Earth-centered inertial speed from West to East, earth $v_{earth\ equator}$ is the Earth's speed at the equator from West to East, lat is the satellite's latitude, and incl in the satellite's inclination. A Waves constellation can be designed with this orbital characteristic to maximize access time that satellites 102a-102n spend over a target ground location and minimize a number of satellites 102a-102n doing so.

In some embodiments, designing a Waves constellation can start with a determination of a desired latitude band 108 for coverage of a target ground locations within latitude band 108. The exemplary disclosed embodiments focus on the Northern Hemisphere, but all Waves constellations can be symmetric about the equator. In some embodiments, coverage from each satellite 102a-102n can extend north of its inclination. In some embodiments, coverage from each satellite 102a-102n can be extended by higher altitudes and the ability of each satellite 102a-102n to steer to larger nadir pointing angles, thereby reducing a required inclination of satellites 102a-102n for a latitude design requirement.

In some embodiments, each satellite 102a-102n can be assigned a desired altitude. This altitude can be used to determine a scan angle to the horizon with the following equation:

$$\frac{(r_{earth} + alt)}{\sin\left(\frac{\pi}{2}\right)} = \frac{r_{earth}}{\sin(\varphi)}$$

wherein $r_{earth}$ is the radius of the Earth, alt is the altitude of the satellite, and p is the scan angle. The above equation can be rearranged to solve for scan angle φ:

$$\varphi = \sin^{-1}\left(\frac{r_{earth}}{r_{earth} + alt}\right)$$

With the altitude and scan angle assigned to each satellite 102a-102n, a slant range can be calculated by applying the Law of Cosines:

$$r_{earth}^2 = R_{slant}^2 + (r_{earth} + alt)^2 - 2 \cdot R_{slant} \cdot (r_{earth} + alt)\cos(\varphi)$$

wherein $r_{earth}$ is the radius of the Earth, $R_{slant}$ is the slant range of the satellite, alt is the altitude of the satellite, and φ is the scan angle. The slant range $R_{slant}$ can be found as a quadratic solution of the above equation:

$$R_{slant} = 2 \cdot (r_{earth} + alt) \cdot \cos(\varphi) - \sqrt{4 \cdot (r_{earth} + alt)^2 \cdot \cos^2(\varphi) - 4 \cdot r_{earth} \cdot alt - 2alt^2}$$

Using the Law of Sines, it is then possible to solve for the ground range of each satellite 102a-102n and the inclination from the desired overlap areas 106a-106n of the coverage areas 104a-104n within wave 100:

$$\frac{(R_{slant})}{\sin\left(\frac{R_{grnd}}{r_{earth}}\right)} = \frac{r_{earth}}{\sin(\varphi)}$$

$$R_{grnd} = r_{earth} \cdot \sin^{-1}\left(\frac{R_{slant} \cdot \sin(\varphi)}{r_{earth}}\right)$$

wherein $R_{grnd}$ is the ground range, $r_{earth}$ is the radius of the Earth, $R_{slant}$ is the slant range of the satellite, alt is the altitude of the satellite, and φ is the scan angle.

The earth angle related to ground range is given by:

$$\Delta\theta = \frac{R_{grnd}}{r_{earth}}$$

wherein Δθ is the angle that ground range $R_{grnd}$ subtends, as measured from the center of the Earth.

Overlap areas between adjacent coverage areas can be now applied, reducing spacing between satellites to ensure proper hand-over of communications or remote sensing. A typical overlap area can reduce a coverage area by 20-50% in radius.

Next, satellites 102a-102n can be arranged so that their coverage areas 104a-104n can fill a circumference of a desired latitude band 108 (as shown in FIGS. 1A and 1B), which is described by the following equation:

$Circum_{lat} = 2\pi \cdot r_{earth} \cdot \cos(lat_{desired})$

At Equator: $Circum_{lat} = 2\pi r_{earth}$

At either pole: $Circum_{lat} = 0$ wherein $Circum_{lat}$ is the circumference of the desired latitude band 108, $r_{earth}$ is the radius of the Earth, and $lat_{desired}$ is the desired latitude in degrees.

In some embodiments, satellites 102a-102n positioned in wave 100 can be evenly spaced around the desired latitude band 108, so the amount of overlap areas 106a-106n should be adjusted appropriately. The amount of overlap areas 106a-106n can proportionately affect the width of coverage of the desired latitude band 108, so it may be desirable to adjust the number of satellites 102a-102n so overlap areas 106a-106n increase and the latitude band 108 grows to cover more of the area of interest (e.g., a target ground location). The width of latitude covered is a function of the amount overlap areas 106a-106n and described by the equation:

$R_{spacing} = 2 \cdot R_{grnd} \cdot (1 - overlap)$ wherein $R_{spacing}$ is the spacing between orbital planes 212a-212n, $R_{grnd}$ is the ground range, and overlap is the overlap areas 106a-106n of adjacent coverage areas 104a-104n. For a 50% overlap, $R_{spacing} = R_{grnd}$.

The thickness of the latitude band 108 is given by:

$$\Delta Lat = \frac{\sqrt{4R_{grnd}^2 - R_{spacing}^2}}{r_{earth}}$$

wherein ΔLat is the thickness of the latitude band 108, $R_{grnd}$ is the ground range, $R_{spacing}$ is the spacing between orbital planes 212a-212n, and $r_{earth}$ is the radius of the Earth. No space-based coverage is provided above this latitude band 108. Lower latitudes can have some coverage, but the Waves constellation is designed to avoid wasting satellite presence in less useful lower latitude parts of the orbit.

Once the thickness of the latitude band 108 is determined, the number of orbital planes 212a-212n can be defined by:

$$N_{planes} = ceiling\left(\frac{Circum_{lat}}{R_{spacing}}\right)$$

wherein $N_{planes}$ is the number of orbital planes 212a-212n (and, by extension, the number of satellites 102a-102n per wave 100), $Circum_{lat}$ is the circumference of the desired latitude band 108, and $R_{spacing}$ is the spacing between orbital planes 212a-212n, and ceiling is an upward rounding function. The $N_{planes}$ can be rounded up to the nearest whole number of overlapping coverages areas 104a-104n are evenly spaced around the Earth.

With the number of orbital planes $N_{planes}$, the updated spacing between orbital planes $R_{spacing}$ is:

$$R_{spacing} = \frac{Circum_{lat}}{N_{planes}}$$

Thus, the updated overlap is:

$$overlap = 1 - \frac{Circum_{lat}}{2 \cdot R_{grnd} \cdot N_{planes}}$$

Therefore, the orbital planes 212a-212n can be evenly spaced in right ascension of ascending node ("RAAN"), as described by:

$$\Delta RAAN = \frac{360°}{N_{planes}}$$

wherein ΔRAAN is the difference of RAAN between adjacent orbital planes 212a-212n in degrees. For an example of even spacing in RAAN, 8 planes are required for full 360° coverage if each satellite provides 45° of longitude coverage at a desired latitude.

Finally, the number of waves can be determined. As the center of each wave climbs and crosses the desired latitude, the wave can slow down and start moving East. After a plurality of orbital planes 212a-212n pass over the latitude, the wave can start descending over the desired latitude. After a period of descending motion 214, the wave can reach a limit where its movement towards the equator loses coverage of the desired latitude. As a result, the optimal number of waves can be a function of latitude coverage. The number of waves can be a rounded up ratio of the orbital period of the satellites divided by the transition time for the wave over the latitude band 108. The transition time can be determined from analysis of the access geometry of the specific orbit to a northernmost point in the latitude band 108. The number of satellites per plane can be defined by:

$$N_{satellites/planes} = ceiling\left(\frac{Period_{full\ orbit}}{Time_{wave\ transit}}\right)$$

Similar to the derivation of the number of orbital planes, the number of waves must be rounded to the nearest whole number. If this step leads to undesired coverage, it is advisable to tailor orbital parameters (e.g., latitude, altitude, inclination angle, etc.) to adjust coverage of the desired latitude band 108 and the amount of overlap areas 106a-106n. This determination of the number of waves can be an iterative process, depending on the desired latitude band 108 requiring access. For example, the equator can require only one wave for full coverage, while higher latitudes can require comparatively more waves to attain full coverage. In some embodiments, even numbers of waves in the Waves constellation can create an exact mirror of access behavior in the Southern latitude band as the Northern latitude band.

Exemplary Waves Constellation Method

Figure 5:
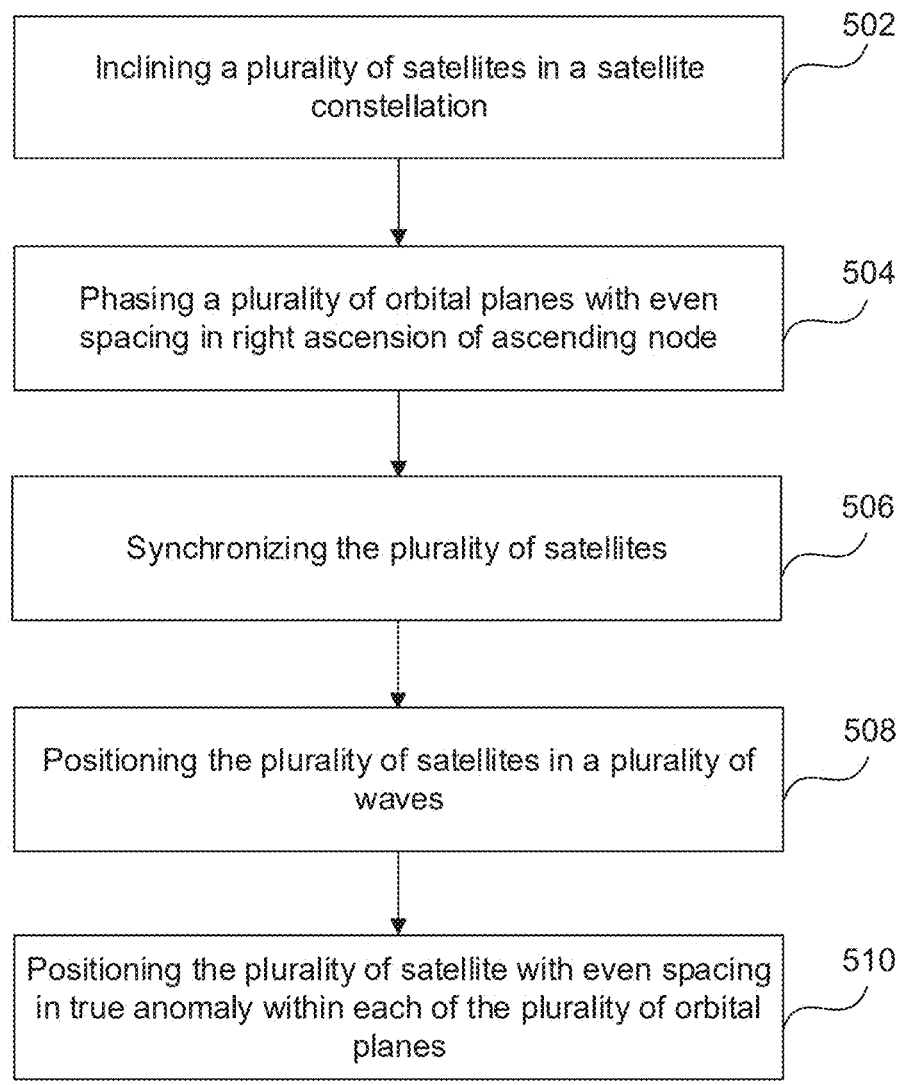
FIG. 5 illustrates a method for arranging satellites in a Waves constellation, according to some embodiments.

FIG. 5 illustrates a method 500 for arranging satellites in a Waves constellation, according to some embodiments.

In some embodiments, at step 502 a plurality of satellites can be inclined in a satellite constellation for a coverage overlap at a latitude band based on predetermined orbital parameters. In some embodiments, the predetermined orbital parameters can be a satellite constellation altitude and an instrumented coverage.

In some embodiments, at step 504 a plurality of orbital planes can be phased with even spacing in right ascension of ascending node based on the inclining.

In some embodiments, at step 506 the plurality of satellites can be synchronized to transition over the latitude band within a predetermined percentage of an orbital period. In some embodiments, the predetermined percentage of an orbital period can be about 10% to about 20% of the orbital period. In some embodiments, synchronizing the plurality of satellites can include maximizing a time for coverage of a latitude band by orbiting in a same direction as a rotation of the Earth.

In some embodiments, at step 508 the plurality of satellites can be positioned in a plurality of waves to maintain constant coverage of the latitude band based on the synchronizing. In some embodiments, positioning the plurality of satellites in a plurality of waves to maintain constant coverage can include maintaining at least one satellite in view of the latitude band consistently.

In some embodiments, at step 510 the plurality of satellites can be positioned with even spacing in true anomaly within each of the plurality of orbital planes based on the plurality of waves.

The method steps of FIG. 5 can be performed in any conceivable order and it is not required that all steps be performed. Moreover, the method steps of FIG. 5 described above merely reflect an example of steps and are not limiting. That is, further method steps and functions are envisaged based on embodiments described in reference to FIGS. 1A, 1B, 2A-2F, 3A, 3B, and 4.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system comprising:
a plurality of satellites synchronized in a Waves constellation configured to separate northern, southern, or both satellite populations from equatorial satellite populations to provide non-equatorial coverage of a target ground location within a predetermined latitude band, wherein:
the plurality of satellites orbit a planetary body in a plurality of orbital planes evenly spaced in right ascension of ascending node,
the plurality of satellites are evenly spaced in true anomaly within each orbital plane,
the Waves constellation comprises a phasing of the plurality of orbital planes, such that satellites in neighboring orbital planes simultaneously cross an equator together with synchronized true anomaly positions, all in ascending or descending motion, thereby forming a wave of satellites in all orbital planes that rise and fall together, and
each satellite within the wave of satellites comprises neighboring satellites directly east and west at a same latitude due to the phasing such that the Waves constellation supports data links between the plurality of satellites within a single orbital plane, across orbital planes, or both among the wave.

2. The system of claim 1, wherein the plurality of orbital planes are evenly spaced in right ascension of ascending node so that as a first satellite in a first wave loses coverage of a target ground location at a predetermined latitude a second satellite in the first wave behind the first satellite in right ascension of ascending node resumes coverage of the target ground location.

3. The system of claim 2, wherein the first wave loses coverage of the target ground location as the first wave departs the predetermined latitude and a second wave resumes coverage of the target ground location at the predetermined latitude.

4. The system of claim 1, wherein the synchronized true anomaly positions allow satellites at a top and bottom of each orbit to fly in a coordinated manner over a maximum latitude and a minimum latitude, thereby providing maximum coverage of a target ground location at a predetermined latitude.

5. The system of claim 1, wherein an orbital overlap of satellites proportionally affects width of coverage of a target ground location at a predetermined latitude.

6. The system of claim 1, wherein the Waves constellation phases the plurality of orbital planes such that a predetermined latitude is covered by a number of satellites equal to the number of orbital planes.

7. The system of claim 1, wherein the Waves constellation phases the plurality of orbital planes so that a target ground location of a predetermined latitude remains in coverage for about 12% of an orbital period of a satellite.

8. The system of claim 1, wherein the plurality of satellites maximize a time for coverage of a target ground location at a predetermined latitude by orbiting in a same direction as a rotation of the planetary body.

9. The system of claim 1, wherein the Waves constellation consistently maintains at least one satellite in view of a predetermined latitude.

10. The system of claim 1, wherein the Waves constellation provides fractional coverage of 100% of latitudes between about 220 to about 50°.

11. The system of claim 1, wherein one or more additional Waves constellations, each at different inclinations, are stacked in layers to extend coverage of one or more predetermined latitudes.

12. The system of claim 1, wherein the data links are transmitted by a single antenna system with fixed pointing forward and aft.

13. The system of claim 1, wherein orbital parameters are tailored to adjust coverage of a target ground location at a predetermined latitude.

14. The system of claim 13, wherein the orbital parameters comprise a predetermined latitude, a predetermined altitude, and a predetermined inclination angle.

15. The system of claim 1, wherein the planetary body comprises the Earth.

16. The system of claim 1, wherein the data links comprise cross-link connections between a plurality of satellites that are co-planar across neighboring orbital planes when the co-planar satellites are at a minimum separation.

17. The system of claim 1, wherein the Waves constellation comprises an even number of a plurality of waves that are symmetric about the equator such that access behavior of the plurality of waves is mirrored at a Southern latitude band and a Northern latitude band.

18. The system of claim 3, wherein the first wave and the second wave are configured to be spaced in true anomaly at a transition time for the first wave to complete transit over the predetermined latitude band.

19. The system of claim 8, wherein each of the plurality of satellites are configured to fly with an eastward movement at a Northernmost part and a Southernmost part of a corresponding non-retrograde inclined orbit.

20. The system of claim 19, wherein an orbital path of each of the plurality of satellites is configured to align with a rotation of the planetary body when the corresponding satellite transitions between an ascending motion in a northern direction and a descending motion in a southern direction.

* * * * *